ated Sept. 26, 1961

3,002,029
STABILIZER FOR BROMO-SUBSTITUTED ACETYLENIC COMPOUNDS
Roger F. Kleinschmidt, Bartlesville, Okla., and Sam H. Pitts, Jr., Idaho Falls, Idaho, assignors to Phillips Petroleum Company, a corporation of Delaware
No Drawing. Filed Mar. 26, 1959, Ser. No. 802,019
8 Claims. (Cl. 260—652.5)

This invention relates to a method of stabilizing bromo-substituted acetylenic compounds. In another aspect the invention relates to a stable composition comprising a bromo-substituted acetylenic compound and a stabilizing agent.

Acetylenic bromides which contain a bromine atom on a tertiary propargylic carbon are extremely reactive and very unstable. Such compounds are far more unstable than other types of halogenated compounds such as perchloroethylene and the like. These compounds are so unstable that they readily decompose as evidenced by discoloration under the action of heat and/or light, even when stored under an inert gas such as nitrogen. Although these compounds are useful as agricultural chemicals, such as nematocides or herbicides, or as chemical intermediates, such as in the synthesis of Vitamin A homologues, effective stabilization of these compounds is necessary before they can be fully developed commercially.

We have now found that a compound having the formula

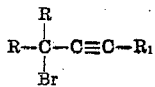

wherein each R is an alkyl radical containing from 1 to 3 carbon atoms, $R_1$ is selected from the group consisting of hydrogen, —R, and

wherein R is as defined above and wherein the two R groups on a propargylic carbon contain a total of not over 5 carbon atoms and can together with the propargylic carbon form a cycloalkyl radical can be stabilized by adding thereto a stabilizing amount of tert-butylcatechol.

It is an object of this invention to provide a method of stabilizing bromo-substituted acetylenic compounds. Another object is to provide a stable composition comprising a bromo-substituted acetylenic compound and a stabilizing agent. Other objects, advantages and features of our invention will be apparent to those skilled in the art from the following discussion.

The bromine-substituted acetylenic compounds to which our invention applies have a general formula as given above and includes such compounds as 3-methyl-3-bromo-1-butyne, 1-ethynylcyclohexyl bromide, 3-methyl-3-bromo-1-pentyne, 2,5-dimethyl-2,5-dibromo-3-hexyne, 3-bromo-3-methyl-1-hexyne, 5-bromo-5-ethyl-3-octyne, 3,6-dibromo-3-ethyl-6-methyl-4-nonyne, 1,2-di(1-bromocyclohexyl) ethyne and 1-(1-bromocyclopentyl)-1-butyne.

The compounds of the above formulas are extremely reactive and unstable because of two structural similarities. In each of these compounds, the bromine is connected in a propargylic location, that is, on the first carbon removed from a carbon attached to a triple bond. In addition, the bromine atom in each of these compounds is connected to a tertiary carbon. This combination of structural similarities render each one of these compounds extremely reactive and very unstable. The alkyl substituents do not affect this reactivity so long as they are small, i.e., not over 3 carbon atoms each or over 5 carbon atoms total on a single propargylic carbon as stated in the above-given general formula.

The amount of tert-butylcatechol needed to stabilize any one of the above-given compounds will depend to a certain extent upon the compound being stabilized. It is desirable to use a minimum of stabilizing agent and the proper amount to be used can readily be determined by one skilled in the art. Generally the amount of stabilizer is within the range of 0.25 to 3.0 volume percent based on the volume of the bromine-substituted acetylenic compound to be stabilized. Preferably the amount of stabilizer is between 0.5 and 1.5 volume percent on the same basis. The method of adding the stabilizer is not particularly important but a good mixture should be obtained.

The bromine-substituted acetylenic compounds can be prepared by reaction of the corresponding hydroxy-substituted acetylenic compound with phosphorus tribromide followed by purification to obtain the desired product. These compounds which are stabilized by our invention are useful as agricultural chemicals and as chemical intermediates as above described.

The following specific example illustrates the effectiveness of the stabilizer of our invention but it is not intended that the invention be limited to the particular embodiment shown.

Example

A run was made in which 3-methyl-3-bromo-1-butyne was prepared by the reaction of 3-methyl-3-hydroxy-1-butyne with phosphorus tribromide.

In this run, 84 grams of 3-methyl-3-hydroxy-1-butyne was charged to a 300 milliliter flask. The flask was then flushed with $CO_2$, and 128 grams of phosphorus tribromide was added dropwise over a period of 1 hour and 25 minutes. It was necessary to supply cooling, as the reaction was exothermic. The reaction mixture was then allowed to stand overnight, after which it was washed with water, aqueous sodium bicarbonate, and again with water. An oily layer amounting to 215.8 grams separated off. Drierite was then added to this oily material, and the resulting mixture was allowed to stand for 2–3 days, after which it was flashed through a 6-inch column. The cut boiling at 53–61° C. at 140–145 mm. mercury absolute pressure amounted to 25.0 milliliters and had a refractive index of 1.4653 at 20° C. This material was 3-methyl-3-bromo-1-butyne and had a slight yellow color.

Three 5 milliliter portions of this material were then treated in the following manner. Sample A was covered with air and capped, sample B was covered with nitrogen and capped, and 0.5 volume percent based on the bromo-substituted compound of 4-tert-butycatechol was added to sample C, after which it was covered with nitrogen and capped.

Decomposition of the 3-methyl-3-bromo-1-butyne is indicated by discoloration or yellowing. Three days later, A was a darker yellow, B was slightly darker than the original color, and C was virtually unchanged. Checks were made at 5, 7 and 10 days with the following results:

|  | Hellige Color Number | | |
|---|---|---|---|
|  | After 5 Days | After 7 Days | After 10 Days |
| A | 11 | 11 | 11 |
| B | 9 | 10 | 10 |
| C | 5 | 5 | 5 |

The higher Hellige color numbers indicate greater discoloration.

It can be seen from the above data that 4-tert-butylcatechol is an effective stabilizer for 3-methyl-3-bromo-1-butyne.

As will be evident to those skilled in the art, various modifications of this invention can be made, or followed, in the light of the foregoing disclosure and discussion, without departing from the spirit or scope thereof.

We claim:

1. The method of stabilizing a compound having the formula

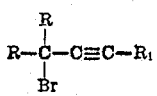

wherein each R is an alkyl radical containing from 1 to 3 carbon atoms, $R_1$ is selected from the group consisting of hydrogen, —R, and

wherein R is as defined above and wherein two R groups on a propargylic carbon contain not over 5 carbon atoms and can together with the propargylic carbon form a cycloalkyl radical which comprises adding to said compound 4-tert-butylcatechol.

2. The method of stabilizing a bromo-substituted acetylenic compound having the formula

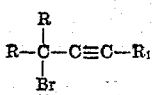

wherein each R is an alkyl radical containing from 1 to 3 carbon atoms, $R_1$ is selected from the group consisting of hydrogen, —R, and

wherein R is as defined above and wherein two R groups on a propargylic carbon contain a total of not over 5 carbon atoms and can together with the propargylic carbon form a cycloalkyl radical which comprises adding to said compound from 0.25 to 3.0 volume percent, based on the volume of the bromo-substituted acetylenic compound, of 4-tert-butylcatechol.

3. The method of claim 2 wherein said 4-tert-butylcatechol is added in an amount between 0.5 to 1.5 volume percent.

4. The method of claim 2 wherein said acetylenic compound is 3-methyl-3-bromo-1-butyne.

5. A stable composition comprising a compound having the formula

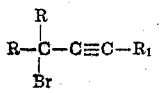

wherein each R is an alkyl radical containing from 1 to 3 carbon atoms, $R_1$ is selected from the group consisting of hydrogen, —R, and

wherein R is as defined above and herein two R groups on a propargylic carbon contain not over 5 carbon atoms and can together with the propargylic carbon form a cycloalkyl radical and a stabilizing amount of 4-tert-butylcatechol.

6. The composition of claim 5 wherein said 4-tert-butylcatechol is present in an amount from 0.25 to 3.0 volume percent, based on the volume of the bromo-substituted acetylenic compound.

7. The composition of claim 5 wherein the 4-tert-butylcatechol is present in an amount between 0.5 and 1.5 volume percent, base on the volume of the bromo-substituted acetylenic compound.

8. A stable composition comprising 3-methyl-3-bromo-1-butyne and from 0.5 to 1.5 volume percent, based on the butyne, of 4-tert-butylcatechol.

References Cited in the file of this patent

UNITED STATES PATENTS

| | | |
|---|---|---|
| 1,950,438 | Carothers et al. | Mar. 13, 1934 |
| 2,008,680 | Carlisle et al. | July 23, 1935 |
| 2,136,333 | Coleman et al. | Nov. 8, 1938 |
| 2,181,102 | Stoesser et al. | Nov. 21, 1938 |
| 2,155,723 | Levine et al. | Apr. 25, 1939 |
| 2,906,782 | Ferri et al. | Sept. 29, 1959 |